(12) United States Patent
Naphade et al.

(10) Patent No.: US 8,306,848 B1
(45) Date of Patent: Nov. 6, 2012

(54) ESTIMATION OF TRANSIT DEMAND MODELS FOR ENHANCING RIDERSHIP

(75) Inventors: Milind Naphade, Hawthorne, NY (US); Sambit Sahu, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/153,725

(22) Filed: Jun. 6, 2011

(51) Int. Cl.
*G06F 17/30* (2006.01)
(52) U.S. Cl. ..................................... 705/7.31
(58) Field of Classification Search ............. 705/7.31
See application file for complete search history.

(56) References Cited

U.S. PATENT DOCUMENTS

2010/0197325 A1\* 8/2010 Dredge ..................... 455/456.3

OTHER PUBLICATIONS

Litman, et al. "Transit Price Elasticities and Cross-Elasticities." Journal of Public Transportation, vol. 7, No. 2, 2004.\*
Alvinsyah, et al. "Impact of the Existing Corridor Due to Implementation of New Public Transport Corridor (Case Study: Jakarta BRT Systems." Journal of the Eastern Asia Society for Transportation Studies, vol. 6, pp. 467-479, 2005.\*
Baxter, et al. "Sugar House Transit Corridor Alternatives Analysis." Jul. 2008.\*
Memorandum to the Honorable Mayor and City Council Members of the City of Dubuque regarding "City in Motion—an IBM First of a Kind Proposal," dated Oct. 1, 2010.\*
Leduc, Guillaume. "Road Traffic Data: Collection Methods and Applications." JRC Technical Notes, Working Papers on Energy, Transport and Climate Change N. 1, 2008.\*

\* cited by examiner

*Primary Examiner* — Susanna M Meinecke Diaz
(74) *Attorney, Agent, or Firm* — F. Chau & Associates, LLC; Louis J. Percello

(57) ABSTRACT

A method of estimating a transit demand graph includes collecting conditional information that includes at least one condition that when satisfied converts at least one non-rider into a rider, generating a non-rider transit demand graph by satisfying one of the conditions, and generating a normalized transit demand graph from the non-rider transit demand graph and a rider transit demand graph. The riders use public transit and the non-riders do not use public transit. The non-rider transit demand graph shows the demand of the non-riders for a public transit route. The rider transit demand graph shows the demand of riders for the same public transit route.

13 Claims, 8 Drawing Sheets

ESTIMATION OF TRANSIT DEMAND MODELS FOR ENHANCING RIDERSHIP

BACKGROUND

1. Technical Field

The present disclosure relates to transportation systems, and more particularly to estimation of transit demand models for enhancing ridership of transportation systems.

2. Discussion of Related Art

Transportation (transit) systems such as urban bus or train systems have a multitude of scheduled routes, where each route is comprised of one or more legs. The start and end points of each leg may be referred to as a waypoint. City planners may select the waypoints and how often a transportation vehicle is to stop at each waypoint based on many factors, such as knowledge of desirable destination sites (e.g., the Mall, the Hospital, the Train Station, the University, etc.), high population centers, and work schedules. For example, it is generally a good idea to have transportation vehicles stop at certain waypoints more frequently between 9 am-5 pm since people typically work during those times and position them near high population centers. However, it can be difficult to optimally select the location of the waypoints and the frequency at which a transportation vehicle should stop at each waypoint.

BRIEF SUMMARY

According to an exemplary embodiment of the present invention, a method of estimating a transit demand graph includes collecting conditional information that includes at least one condition, that when satisfied, converts at least one non-rider into a rider, generating a non-rider transit demand graph by satisfying one of the conditions, and generating a normalized transit demand graph from the non-rider transit demand graph and a rider transit demand graph. The riders use public transit and the non-riders do not use public transit. The non-rider transit demand graph shows the demand of the non-riders for a public transit route. The rider transit demand graph shows the demand of riders for the same public transit route. The method or portions thereof may be performed by a data processing machine (e.g., a computer, processor, etc.).

According to an exemplary embodiment of the present invention, a method of estimating a transit demand graph includes generating a non-rider transit demand graph from positions of non-riders, positions of waypoints of public transit routes, and a condition that directs at least one of the non-riders to become a rider of a public transit route, and generating a transit demand graph from the non-rider transit demand graph and a rider transit demand graph. The non-rider transit demand graph shows the demand of non-riders for the public transit route and the rider transit demand graph shows the demand of riders for the same public transit route. The method may be performed by a data processing machine (e.g., a computer, a processor, etc.).

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION

Figure 1:
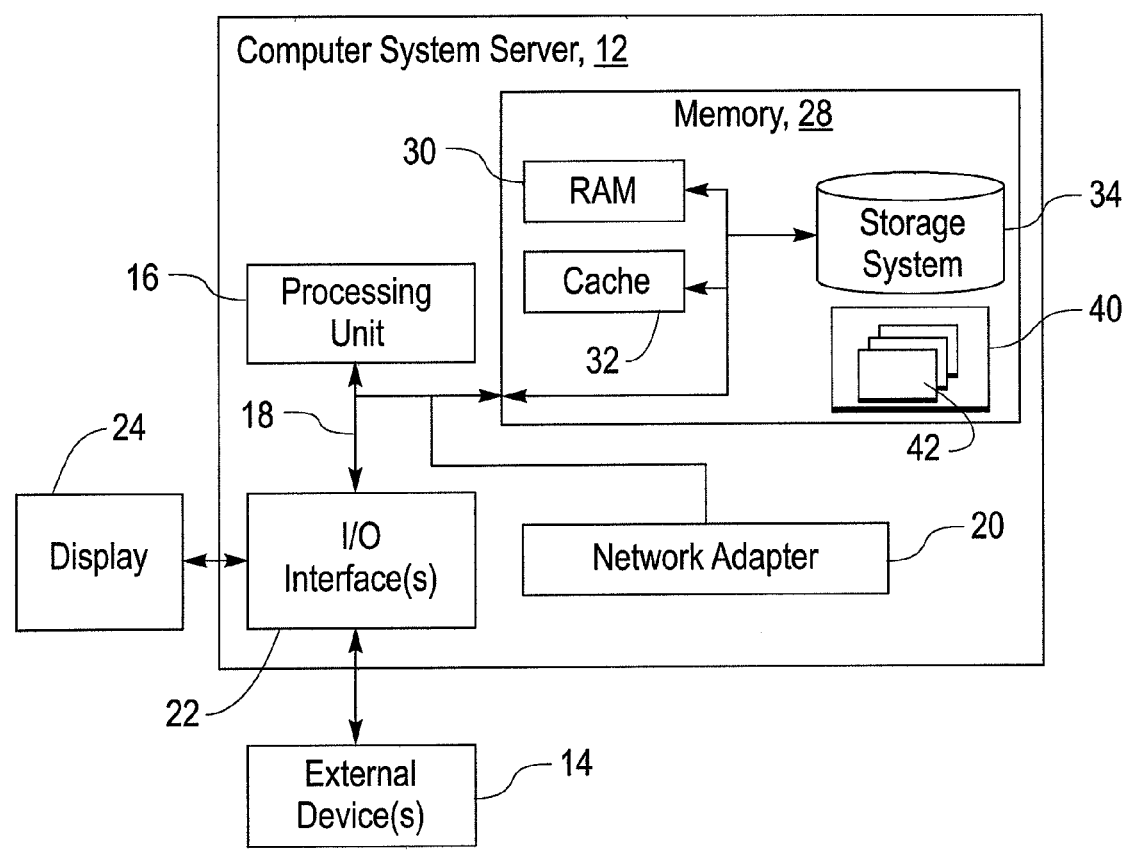
FIG. 1 depicts a cloud computing node according to an embodiment of the present invention.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
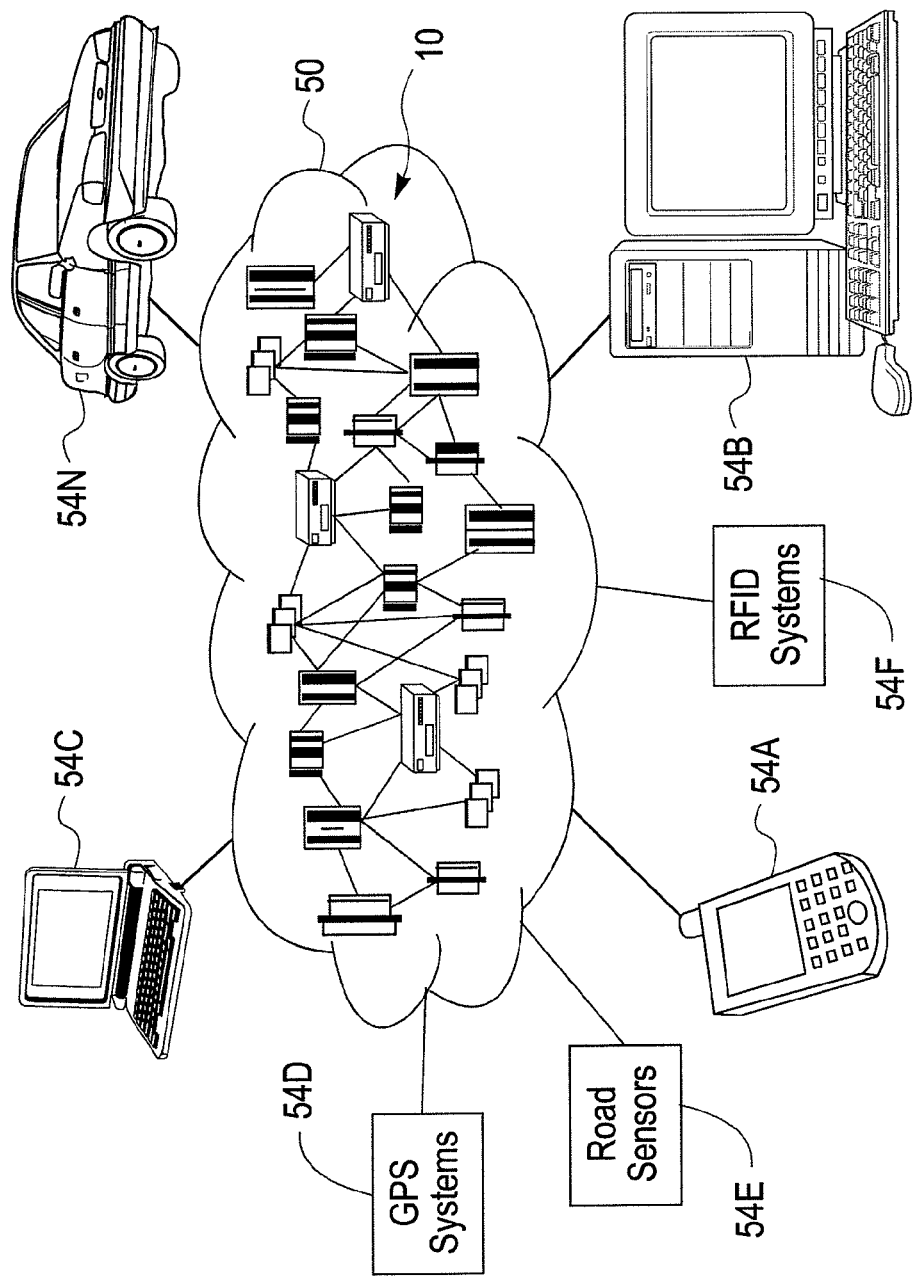
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone/smartphones 54A, desktop computer 54B, laptop computer 54C, GPS systems (e.g., carried by individuals, or located within trains, buses, taxis, etc.) 54D, Road Sensors 54E, Radio Frequency Identity (RFID) Systems 54F, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
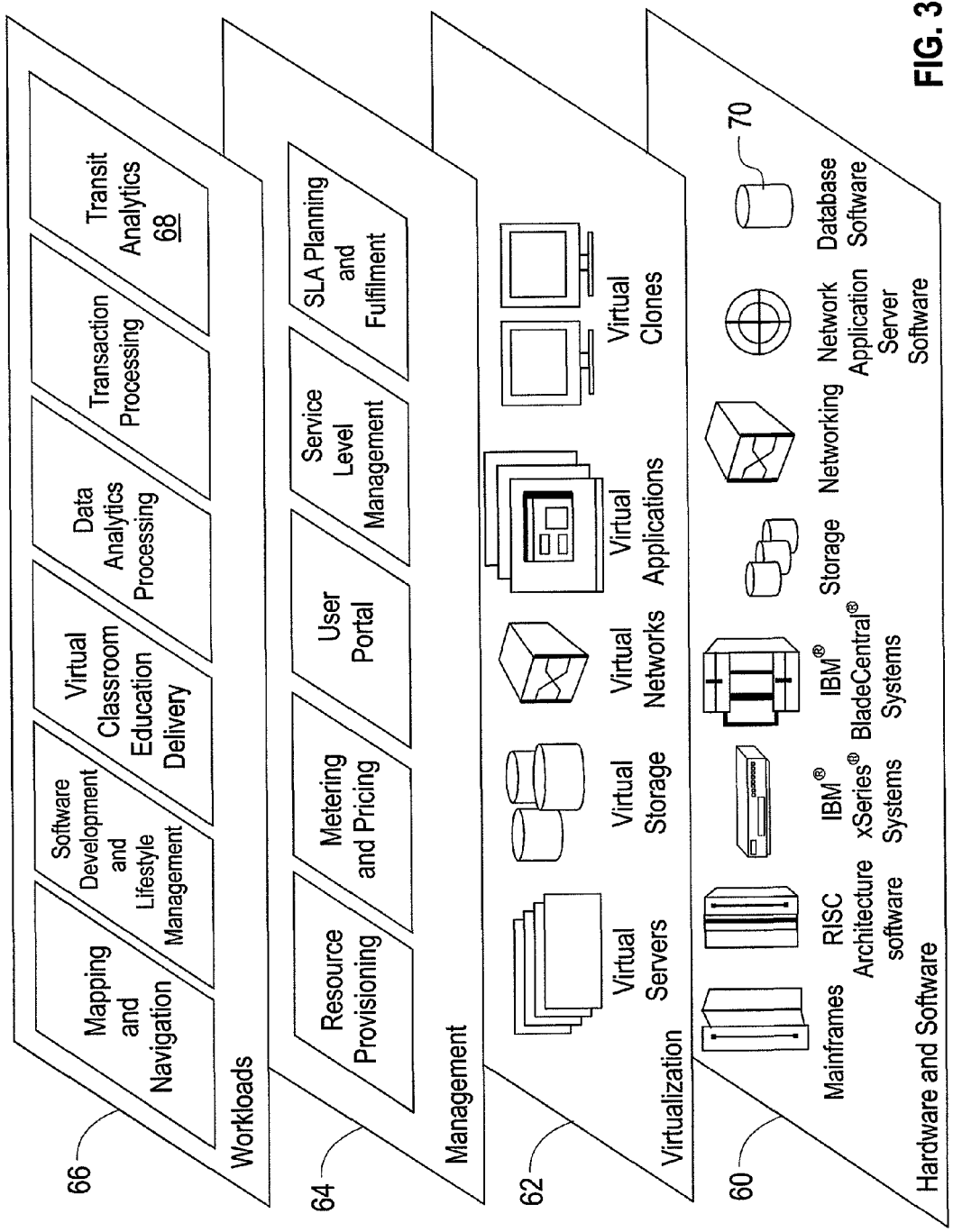
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software 70, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and in particular, transit analytics 68 to generate transit demand graphs.

A transit demand graph visualizes the demand for one or more public transportation routes by people. Public transportation vehicles such as buses, trains, subway-trains, ferries, etc. transport people across these routes. A transit demand graph could be for example, the part or the entire route of a single bus, where each leg is marked with the expected passenger demand.

Figure 4A:
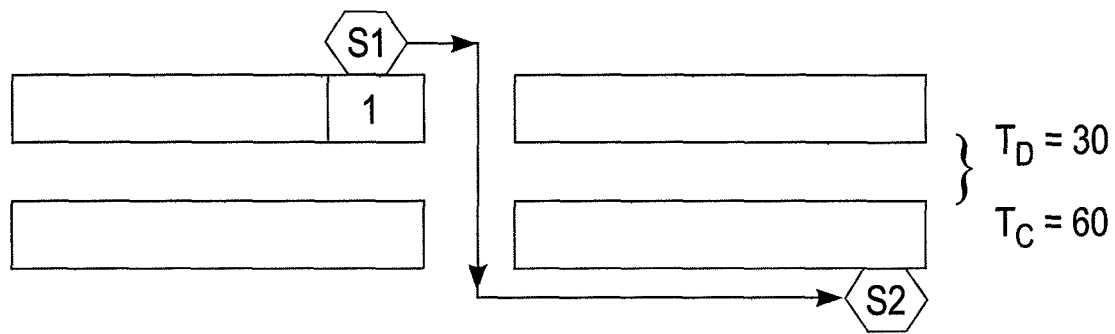
FIG. 4A and FIG. 4B show examples of transit demand graphs for a transit vehicle travelling along a single leg of a transit route.
Figure 4B:
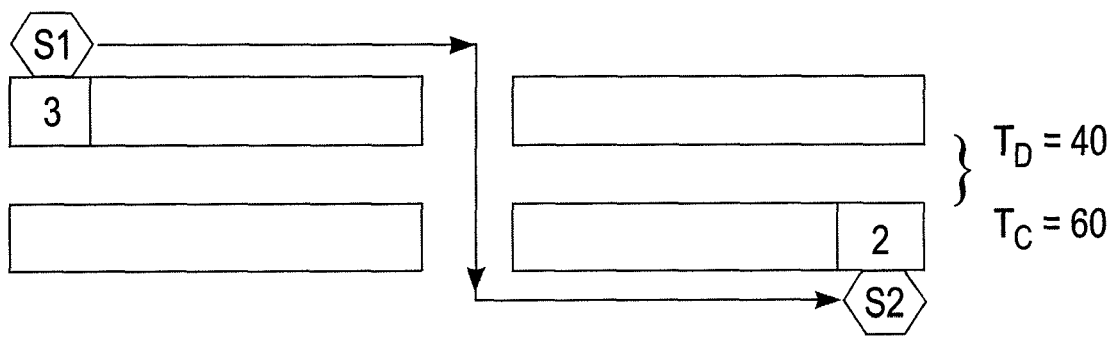

FIGS. 4A and 4B show examples of transit demand graph for a transit vehicle travelling along a single leg of a transit route (e.g., a bus route). FIG. 4A illustrates a leg A with a stop S1 at location 1 and a stop S2 at location 2. The total demand $T_D$ for the leg A is 30 passengers out of a total capacity $T_C$ of 60. For example, on average, a transit vehicle following leg A can expect to deliver 30 passengers from stop S1 to stop S2, even though the vehicle has room for 60 passengers. FIG. 4B illustrates a modification of leg A, where stop S1 has been moved to location 3, resulting in leg B. The total demand $T_D$ for leg B is 40 passengers out of a total capacity $T_C$ of 60. In this example, it is assumed that the modification was made based solely on information about riders. A rider is a person that takes public transportation. For example, it is assumed that there was knowledge that location 3 is closer to more existing riders than location 1.

However, the transit analytics 68 can estimate transit demand graphs based on rider information and non-rider information. A non-rider is a person that does not currently use public transportation, but could if certain conditions are right. The rider information may include the current location of the riders and corresponding conditional information about what could make the riders become non-riders. The non-rider information may include the current location of the non-riders and corresponding conditional information about what could make the non-riders become riders of public transportation.

Figure 5:
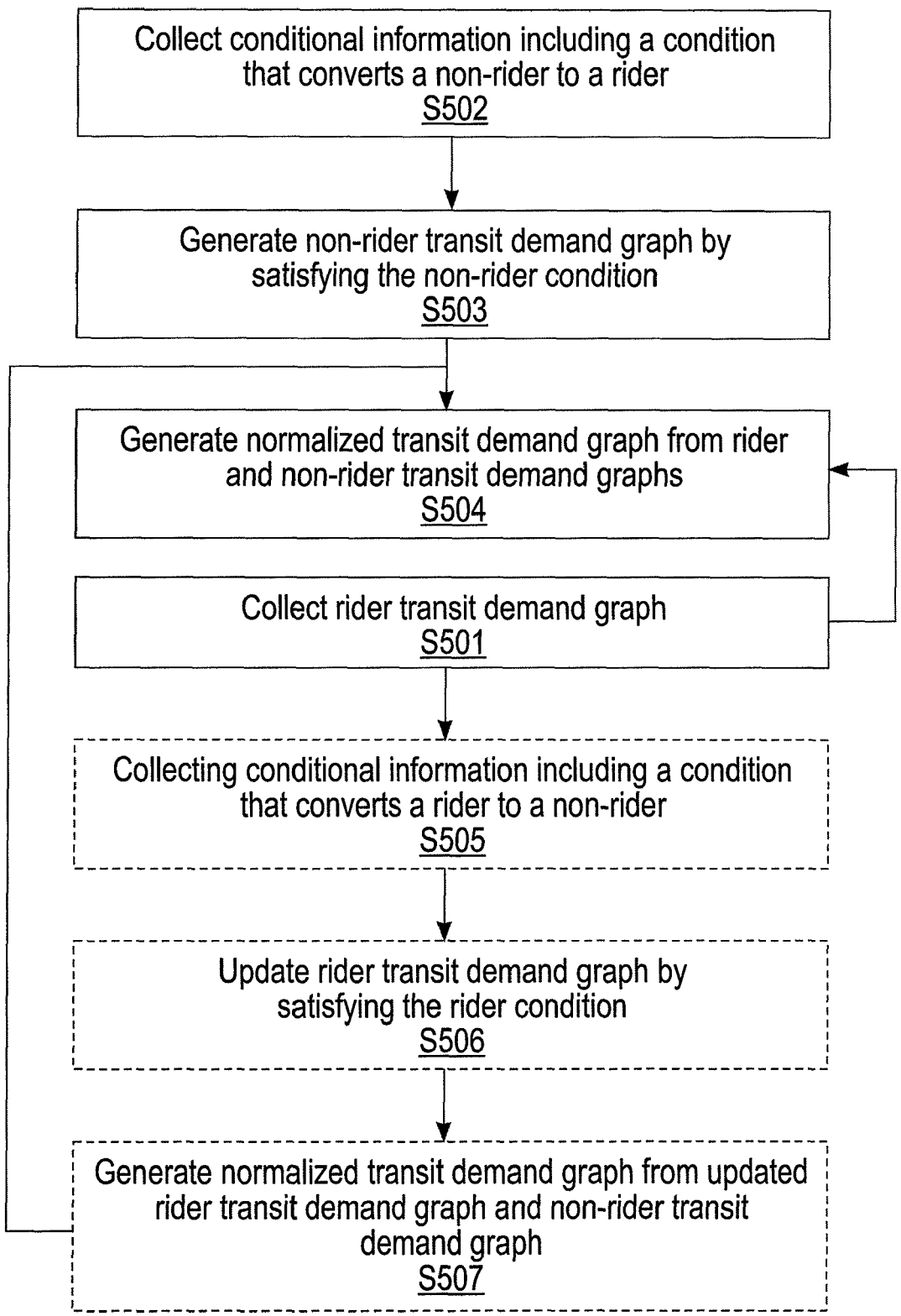
FIG. 5 illustrates a method of estimating a transit demand graph that may be performed according to an exemplary embodiment of the invention.

FIG. 5 illustrates a method of estimating a transit demand graph that may be performed by the transit analytics 68 according to an exemplary embodiment of the invention. Referring to FIG. 5, the method includes collecting a rider transit demand graph (S501), collecting non-rider conditional information including a condition that converts a non-rider to a rider (S502), generating a non-rider transit demand graph by satisfying the condition (S503), and generating a normalized transit demand graph based on the rider transit demand graph and the non-rider transit demand graph (S504). The collecting of the rider transit demand graph can be performed after the non-rider conditional information is collected or after the non-rider transit demand graph is generated.

Figure 6A:
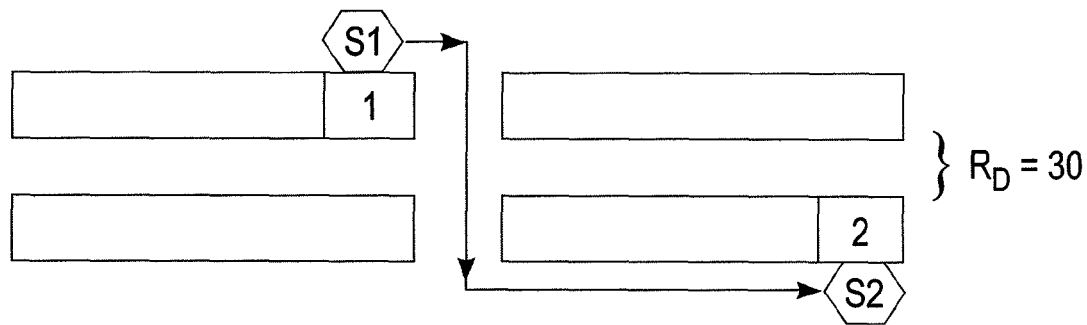
FIG. 6A illustrates an example of a rider transit demand graph that may be generated by the method of FIG. 5.
Figure 6B:
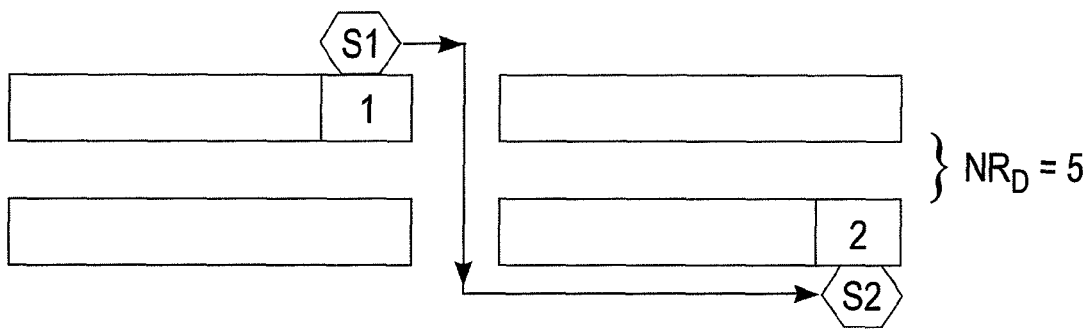
FIG. 6B illustrates an example of a non-rider transit demand graph that may be generated by the method of FIG. 5.
Figure 6C:
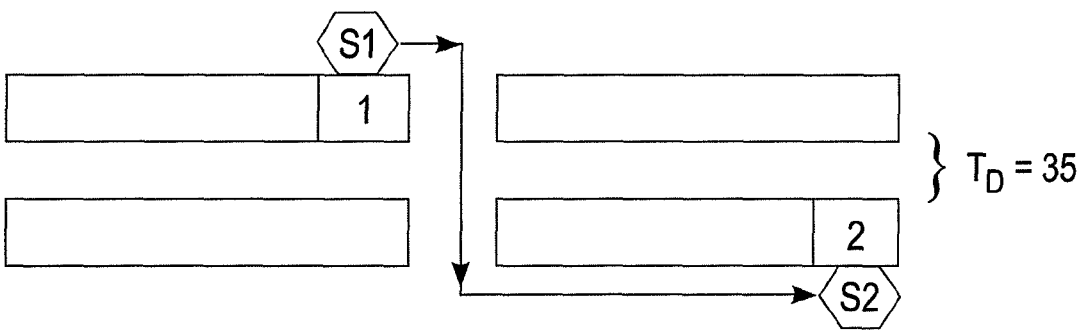
FIG. 6C illustrates a normalized transit demand graph that may be generated from the transit demand graphs of FIGS. 6A and 6B based on the method of FIG. 5

FIG. 6A illustrates an example of a rider transit demand graph for a route that may be collected by the method of FIG. 5. The route has a rider demand $R_D$ of 30. FIG. 6B illustrates an example of a non-rider transit demand graph for the same route that may be collected by the method of FIG. 5. For example, the conditional information gathered at block S502 of the method may indicate that 50% of non-riders living near stop S1 are likely to be come riders if the transit vehicle were to provide WIFI service. At block S503 of the method the non-rider transit demand graph of FIG. 6B may be generated by satisfying the condition that WIFI be present on the transit vehicle and applying this 50% rule to the known number of non-riders living near stop 51 (e.g., assume ten) to arrive at the non-rider demand $NR_D$ of 5. FIG. 6C illustrates a normalized transit demand graph that may be generated by the method of FIG. 5 based on the rider transit demand graph of FIG. 6A and the non-rider transit demand graph of FIG. 6B. For example, assuming the addition of WIFI has not caused existing riders of the route to become non-riders, the normalized demand graph of FIG. 6C can be calculated by summing the rider demand $R_D$ of 30 with the non-rider demand $NR_D$ of 5 to arrive at a total transit demand $T_D$ of 35.

In an alternate embodiment of the present invention, the method further includes collecting rider conditional information including a condition that converts a rider to a non-rider (S505), updating the rider transit demand graph by satisfying the rider condition (S506), and generating a normalized transit demand graph based on the updated rider transit demand graph and the non-rider transit demand graph (S507).

Figure 7A:
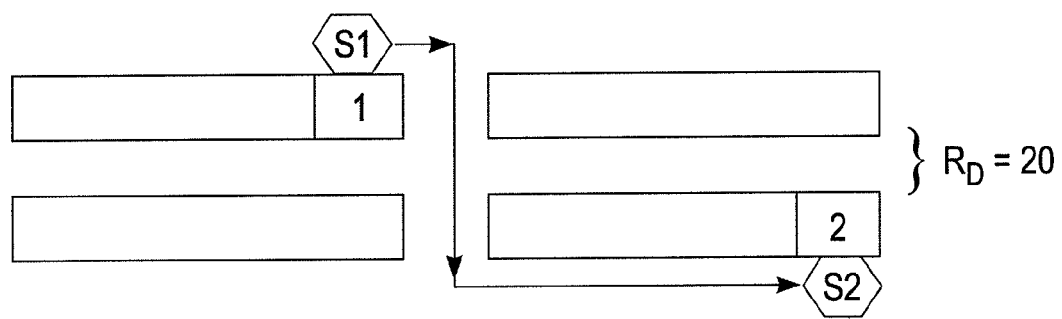
FIG. 7A illustrates an example of a rider transit demand graph for a route that may have been updated by the method of FIG. 5.
Figure 7B:
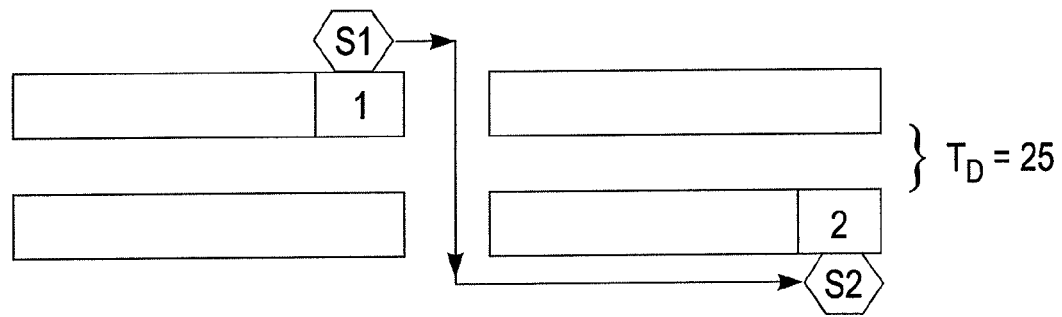
FIG. 7B illustrates an example of a transit demand graph that may be generated from FIGS. 6B and 7A by the method of FIG. 5.

FIG. 7A illustrates an example of a rider transit demand graph for the route that may have been updated at block S506 in the method of FIG. 5. The rider demand $R_D$ has been reduced from 30 to 20 at block S506 where a rider condition collected at block S505 is satisfied indicating that some riders would be converted to non-riders. For example, assume that the condition indicated that ⅓ of riders would become non-riders if overhead storage racks in the transportation vehicle were removed and the addition of the WIFI required the removal of the racks. FIG. 7B illustrates the normalized transit demand graph, which may be generated from block S507. The graph is a combination of the non-rider demand transit graph in FIG. 6B and the rider demand transit graph in FIG. 7A, yielding a total transit demand of 25 ($R_D$=20+$NR_D$=5).

Figure 8A:
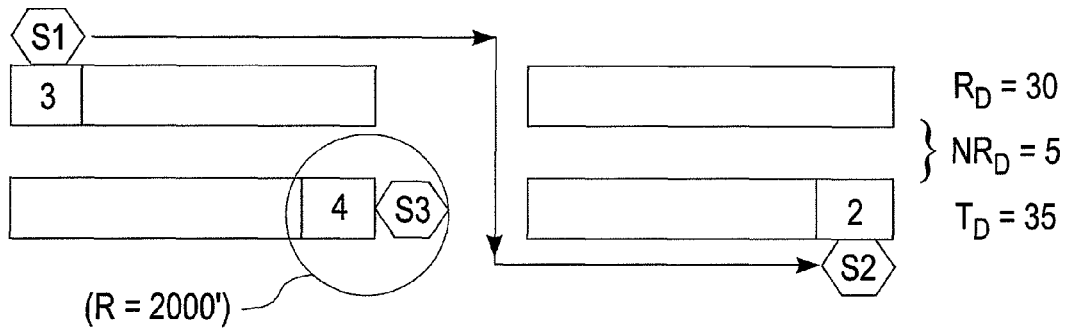
FIGS. 8A and 8B illustrate examples transit demand graphs that may be generated based on satisfying a condition according to the method of FIG. 5.
Figure 8B:
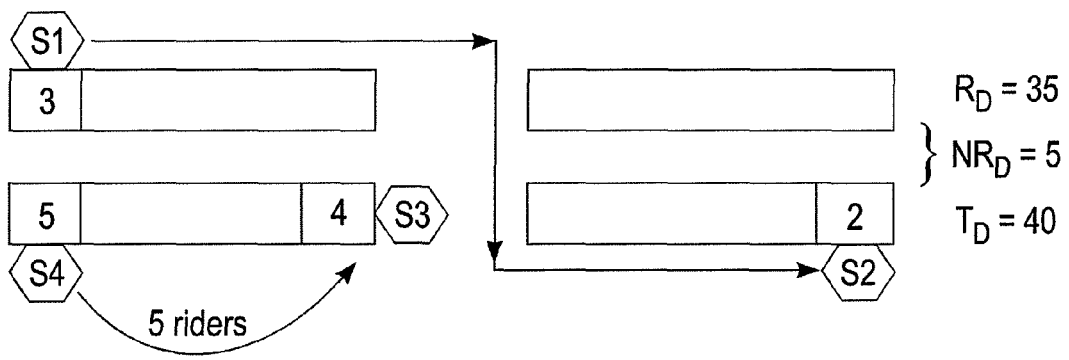

FIG. 8A illustrates an example of a normalized transit demand graph generated based on satisfying the condition that 50% of non-riders living within 2000 feet of a transit stop would become riders. The example assumes an existing rider demand $R_D$ of 30 and a generated $NR_D$ of 5 due to the addition of stop S3 and the presence of 10 non-riders within 2000 feet of stop S3. Accordingly, the total transit demand $T_D$ is 35. FIG. 8B illustrates an example of a normalized transit demand graph that was generated when another nearby route was considered that includes stop S4. For example, the addition of stop S3 created an additional rider demand $R_D$ of 5 for the route since 5 of the riders that would normally take a transit vehicle that uses stop S4, have switched to a transit vehicle using stop S3. While a rider that switches from one route to another route is still a rider, they could be considered a non-rider of the original route.

The rider and non-rider demand graphs are based on the locations of riders and non-riders and the location of each waypoint of each transit route. For example, the locations of all the waypoints, the route configurations, and the route types (e.g., bus route, subway route) may have been entered into a local database or a remote database, where each is accessible to the transit analytics 68.

The locations of riders and non-riders can be deduced from sensor data input to the transit analytics 68. These locations may include street addresses, GPS coordinates, etc. These locations and whether they belong to riders or non-riders can be inferred in various ways. For example, the locations can be inferred from the positions of mobile phones 54A and their proximity or lack of proximity to known transit routes. Mobile phone tracking tracks the current position of a moving or stationary mobile phone. The phone can be located based at least on the roaming signal it emits, which contacts nearby antenna towers, and does not require an active call. GSM localization can then be performed using multilateration based on the signal strength to nearby antenna masts. Further, many cellular phones include a GPS unit, which allows the phone to determine and send its location based on satellites. Users of the phones 54A can opt-in to being tracked by downloading an application that periodically reports the position of the phone to the analytics 68. The application may also send a unique identification code so that phones can be distinguished from one another.

The transit analytics 68 can compare its knowledge of existing transit routes with the received locations to determine whether a location corresponds to a rider or a non-rider. For example, if several locations for the same phone are similar to points along an existing bus route, it can be assumed that this phone and the locations its reports correspond to a rider. However, if most or all of the positions reported from a same phone differ from that of all transit routes, it can be assumed that this phone and locations it reports belong to a non-rider. Further, while an automobile driver may coincidentally follow some of the same points as a known bus route; it is unlikely that they will take them all. Moreover, the transit analytics 68 can examine the timestamps of the locations received by the phones to determine an average speed of the phone. If the average speed of the phone exceeds that which is expected of public transit, it can be assumed that the phone and the locations its reports belong to a non-rider.

Automobile computer systems 54N may report their positions to the transit analytics 68 in a manner similar to the phones 54A. However, since these positions are coming from automobiles, it can be assumed that they come from non-riders.

The positions of riders can also be determined by placing Radio Frequency Identification (RFID) systems 54F having RFID or Near Field Communication (NFC) sensors in transit terminals, transit entryways, transit exits, transit vehicles, etc. The rider can carry a fare card with an embedded RFID transmitter or a NFC transmitter. When the rider brings the fare card near an RFID system 54F, the system can communicate the position of a rider to the transit analytics 68. For example, a transportation vehicle can determine its own position using a built-in GPS or other methods, and report that as the rider's position when its RFID sensor is triggered by the fare card. The fare cards may transmit a unique identification to the RFID sensor so that it can be determined whether a rider has left the transportation vehicle. For example, when a rider enters and leaves a transportation vehicle with a fare card, the RFID sensor receives their ID. Since the entry and exit are likely to be spaced apart, the first reception of the ID could be interpreted as the rider getting on, while the second reception could be interpreted as the rider exiting.

The positions of non-riders may also be sent to the analytics 68 using RFID systems 54F. For example, some toll booths are equipped with an RFID system that automatically charges an automobile driver a toll when they receive an RFID transmission from a tag on the automobile. These toll booths can be altered to send their position to the transit analytics 68 as a position of a non-rider each time they charge an automobile a toll. Further, additional such RFID systems 54f could be placed throughout a city to send additional positions of the non-riders to the transit analytics 68. While transit vehicles such as buses may also pass through such RFID systems 54, the RFID message sent from each vehicle may be configured to identify the vehicle type to prevent positions of transit vehicles from being erroneously listed as non-riders.

The transit routes may also be deduced by the transit analytics 68 by receipt of location information from transit vehicles. The transit vehicles may transmit an identification code, their transit type (e.g., bus, subway), and their position to the transit analytics 68 each time they stop at a new stop so the transit analytics 68 can deduce the route followed and store it for later use.

Once the locations of the riders and the locations of the transit routes are known, a rider transit demand graph can be generated. For example, as discussed above, it is possible to determine the number of passengers at each stop and the positions of each stop relative to an existing route. Thus, this number can be applied to a corresponding leg of the route as the rider demand for that leg. The process can be repeated for all legs of the route until a complete rider transit demand graph has been generated for the route, which corresponds to block (S501), which can collect one or more rider transit demand graphs.

The collection of the non-rider conditional information at block S502 may be performed before or after the rider transit demand graphs are collected. The method of block S505, collecting the rider conditional information, is optional and may be performed independently of the collection of the non-rider conditional information. As discussed above, the non-rider conditional information includes conditions that if satisfied, would cause a non-rider (e.g., an auto driver) to be converted into a rider (e.g., a bus rider) and the rider conditional information includes conditions that if satisfied would cause the rider (e.g., subway rider) to be converted into a non-rider (e.g., auto driver).

For example, the conditional information can be derived from feedback input by non-riders and riders through surveys. For example, non-riders can be asked to list features that would get them to take public transportation and riders can be asked to list features that would get them to stop taking public transportation. Since non-riders and riders alike may not know what features to list, the surveys may provide a list of parameters that can be ranked according to how likely it is to get them to take public transportation or stop taking public transportation.

The below provides some examples of parameters and survey questions. However, embodiments of the present invention are not limited thereto, as various parameters and survey questions may be provided.

Examples of the parameters may include transit vehicle stop distances from certain locations/landmarks (home, business, grocery, library, etc.), desired wait times, the presence/absence of certain features, for example, air conditioning, reclining seats, padded seats, music, WIFI, television, overhead storage, automated announcements, a lift for a wheelchair, bicycle carriers, a particular vehicle fuel type (natural gas) etc.

As an example, a survey could ask the non-rider whether the presence of a transit vehicle stop within a thousand feet of a certain location is likely to make them take public transit, while the rider could be asked whether moving a transit vehicle stop they currently use an additional 1000 feet away is likely to make them stop taking public transit.

If the survey provides several different stop distances (e.g., 1000 feet, 2000 feet, 1 mile, etc.) between each location and the proposed transit stop, the person could rank each with a numerical value indicating how much more or less likely it would get them to take or stop taking public transit. For example, assume a non-rider ranks placing a transit vehicle stop within 1000 feet of his home a 9 (e.g., very likely to get him to take public transit), but ranks placing a transit vehicle stop within a mile of his home as a 4 (e.g., very unlikely to get him to take public transit). Percentages could then be applied to each numeral value, where a 9 could mean that a stop within 1000 feet has a 90% chance making this person take public transit, while placing the stop within a mile only has a 40% chance of getting this person to take public transit.

As another example, the survey could ask a non-rider whether an average wait time of 20 minutes for a transit vehicle is likely to get them to take public transit, or ask a rider whether increasing the current wait time by an additional 20 minutes is likely to get them to stop taking public transportation. As with the stop distances, the individuals may be asked to rank several wait times using numeral values.

As another example, a survey may query individuals on combinations of parameters. For example, a non-rider may be asked whether a bus stop within 2000 feet of their home and with an average waiting time of 25 minutes is likely or unlikely to get them to take the bus.

As another example, a survey may provide a list of parameters, where the non-rider/rider selects the minimum set of parameters that would get them to take public transit or stop taking public transit.

The surveys may be administered to the non-riders and riders in various ways, such as in person interviews, over the phone, through the mail, or electronically via email, social network mechanisms, instant message, text messages, mobile applications, desktop applications, etc. The results of the surveys sent electronically can be sent to the transit analytics 68 over the internet and stored in a database in the cloud 50. The results of the non-electronic surveys can be entered manually to the transit analytics 68.

The conditional information about what could get a rider to become a non-rider and a rider to become a non-rider can be derived from data other than surveys, such as by analyzing current transit patterns (e.g., from road sensors 54E) and positions of mobile phone/pda 54A (e.g., from GPS positioning, GSM positioning, etc.). For example, if current traffic patterns suggest a major delay or a complete blockage of a major roadway artery, it is more likely that riders will be converted into non-riders. Further, traffic congestion or a complete blockage could be inferred when a multitude of phone/pda 54A positions are on known roadways, but are moving much more slowly than the average expected speed. Further, if a new roadway has opened up, and traffic congestion has been severely reduced as compared to a previous measure, it may be more likely that riders will become converted into non-riders.

As discussed above with reference to block S503, the non-rider transit demand graph is generated by satisfying a condition of the non-rider conditional information. For example, a user of the transit analytics 68 can arbitrarily satisfy any one of the derived conditions. For example, assume a user has satisfied the condition that 50% of non-riders will be become riders if stops were located within 1000 feet of a mall and a 1000 feet of a grocery store they routinely visit. The known locations of non-riders can then be compared against the location of the mall and the grocery to determine how many non-riders routinely visit both the mall and the grocery store. If it is assumed that a transit route already exists with a bus stop to the mall and a new stop is added to the grocery store, it can be expected that the non-rider demand for that leg of the route will become 10 if 20 non-riders were discovered routinely visiting both the mall and the grocery. Thus, the non-rider transit demand graph could be illustrated as a leg of the known route labeled with a non-rider demand of 10.

However, assume that the addition of the new stop causes an additional wait time of 10 minutes to a subsequent stop. Further, assume that the rider transit demand graph initially collected from block S501 indicated that a demand of 50 riders for that route and that the rider conditional information collected in block S505 indicated that 10% of riders will become non-riders if their wait time is increased by 10 minutes. Thus, at block S506 an updated demand transit graph may be generated for the route having a rider demand of 45. At block S507, a normalized transit demand graph may be generated having a demand of 55 (e.g., 10 from non-riders and 45 from riders). In this example, since the ridership has been increased (e.g., from 50 to 55), a city official could use this information as an incentive to add the new stop to the route. Thus, before actually applying a change to a transit route, a user of the transit analytics 68 can predict what effect this change is likely to have on the current ridership of that route from both existing riders and those that might become riders as a result of the change.

It is to be understood that exemplary embodiments disclosed above are illustrative only, as the invention may be modified and practiced in different but equivalent manners apparent to those skilled in the art having the benefit of the teachings herein. It is therefore evident that exemplary embodiments disclosed herein may be altered or modified and all such variations are considered within the scope and spirit of the invention.

What is claimed is:

1. A method of estimating a transit demand graph, the method comprising:
   collecting conditional information that includes at least one condition that when satisfied converts at least one non-rider into a rider, wherein riders use public transit and non-riders do not use public transit;
   generating, by a processor, a non-rider transit demand graph by satisfying one of the conditions, wherein the non-rider transit demand graph shows the demand of the non-riders for a public transit route; and
   generating a normalized transit demand graph from the non-rider transit demand graph and a rider transit demand graph, wherein the rider transit demand graph shows the demand of riders for the same public transit route,
   wherein generating the non-rider transit demand graph comprises:
      determining by the processor non-riders that are within a predetermined distance of the public transit route;
      determining a subset of the non-riders that become riders when the condition is satisfied; and
      generating the non-rider transit demand graph from the sub-set of non-riders and the public transit route,
   wherein determining the non-riders comprises:
      comparing positions of mobile phones against waypoints of the route; and
      determining a non-rider when the positions do not correspond with those of the waypoints.

2. The method of claim 1, wherein collecting the conditional information comprises:
   parsing survey results for feedback on changes proposed by a survey that would encourage a non-rider to become a rider; and
   deriving the conditions from the feedback.

3. The method of claim 1, wherein the comparing is performed during a scheduled route time period of the transit route.

4. The method of claim 3, wherein the positions do not correspond when a majority of the positions are considered to be outside a transit vehicle that travels the transit route.

5. The method of claim 1, wherein before the normalized transit demand graph is generated, the method comprises:
   collecting rider conditional information that includes at least one rider condition that when satisfied converts at least one rider into a non-rider; and
   updating the rider transit demand graph by satisfying one of the rider conditions.

6. The method of claim 5, wherein collecting the rider conditional information comprises:
   parsing survey results for feedback on changes proposed by a survey that would encourage a rider to become a non-rider; and
   deriving the rider conditions from the feedback.

7. The method of claim 1, wherein the rider transit demand graph is generated by:

determining riders that are within a predetermined distance of the public transit route; and generating the rider transit demand graph from the determined riders and the public transit route.

8. The method of claim 7, wherein determining the riders comprises:

comparing positions of a mobile phone against waypoints of the route; and determining a rider when the positions of the mobile phone correspond with those of the waypoints.

9. The method of claim 8, wherein the comparing is performed during a scheduled route time period of the transit route.

10. The method of claim 8, wherein the positions correspond when a majority of the positions of the mobile phone are considered to be inside a transit vehicle.

11. The method of claim 1, wherein the rider transit demand graph is generated based on a tally of a number of fare cards used on a transit vehicle following the route.

12. A computer program product for estimate a transit demand graph, the computer program product comprising:

a computer readable storage medium having computer readable program code embodied therewith, the computer readable program, code comprising:

computer readable program code configured to collect conditional information that includes at least one condition that when satisfied converts at least one non-rider into a rider, generate a non-rider transit demand graph by satisfying one of the conditions, and generate a normalized transit demand graph from the non-rider transit demand graph and a rider transit demand graph, wherein generating the non-rider transit demand graph comprises:

determining non-riders that are within a predetermined distance of a public transit route;

determining a subset of the non-riders that become riders when the condition is satisfied; and generating the non-rider transit demand graph from the sub-set of non-riders and the public transit route, wherein determining the non-riders comprises:

comparing positions of mobile phones against waypoints of the route; and determining a non-rider when the positions do not correspond with those of the waypoints.

13. The computer program product of claim 12, wherein the riders use public transit, the non-riders do not use public transit, and the rider transit demand graph shows the demand of riders for the same public transit route.

* * * * *